United States Patent [19]

Jennings et al.

[11] 4,081,996

[45] Apr. 4, 1978

[54] FORCE-MEASURING DEVICES

[75] Inventors: Marvin D. Jennings, Naperville; Rolf E. Schmidgall, Hinsdale, both of Ill.

[73] Assignee: International Harvester Company, Chicago, Ill.

[21] Appl. No.: 765,011

[22] Filed: Feb. 2, 1977

[51] Int. Cl.² .............................................. G01L 1/04
[52] U.S. Cl. ...................................... 73/141 A; 172/7
[58] Field of Search .......................... 73/141 A; 172/7; 177/225, 234, 132, 136, 139

[56] References Cited

U.S. PATENT DOCUMENTS

| | | | |
|---|---|---|---|
| 1,094,904 | 4/1914 | Hughes | 73/141 A X |
| 3,033,033 | 5/1962 | Dillon | 73/141 A |
| 3,167,953 | 2/1965 | Dillon | 73/141 A |
| 3,648,514 | 3/1972 | Vilain | 73/141 A X |
| 3,695,096 | 10/1972 | Kutsay | 73/141 A X |

FOREIGN PATENT DOCUMENTS

| | | | |
|---|---|---|---|
| 940,225 | 10/1963 | United Kingdom | 177/225 |

*Primary Examiner*—Charles A. Ruehl
*Attorney, Agent, or Firm*—Douglas W. Rudy; Floyd B. Harman

[57] ABSTRACT

Force-measuring devices are provided for measuring the force transmitted between two members, including a force-transmitting element of resiliently deformable material and of generally C-shaped cross-sectional configuration having inner and outer generally cylindrical and concentric surfaces and an axially extending slot defined by facing angularly spaced surfaces. The outer cylindrical surface is engagable by the members at diametrically opposite portions of the element which lie along a diametral plane generally transverse to a radial plane through the slot with the diametrically opposite portions being relatively displaced toward each other in proportion to the force transmitted between the members. Such displacement is measured by a potentiometer having an arm rotated through a lever member from displacement of one of the diametrically opposite portions relative to the other. In one embodiment, the lever is disposed within the force-transmitting element and includes a portion engaged from an internal surface of the element. In another embodiment, the lever member is located on the outside and is pivoted to one of the two members between which the force is transmitted while being coupled to the other of such members.

19 Claims, 10 Drawing Figures

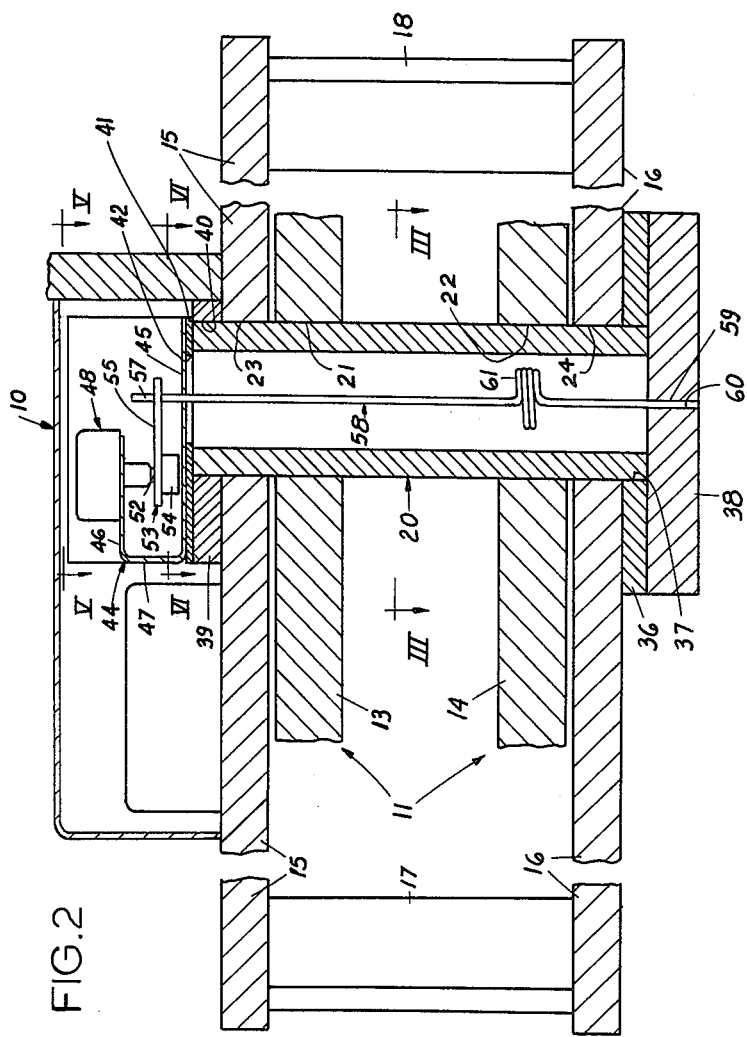
FIG.2
FIG.1
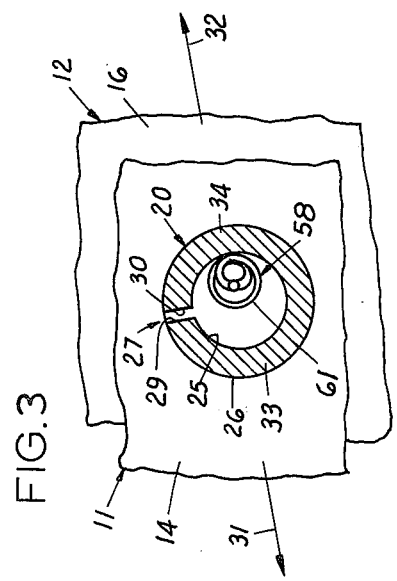
FIG.3

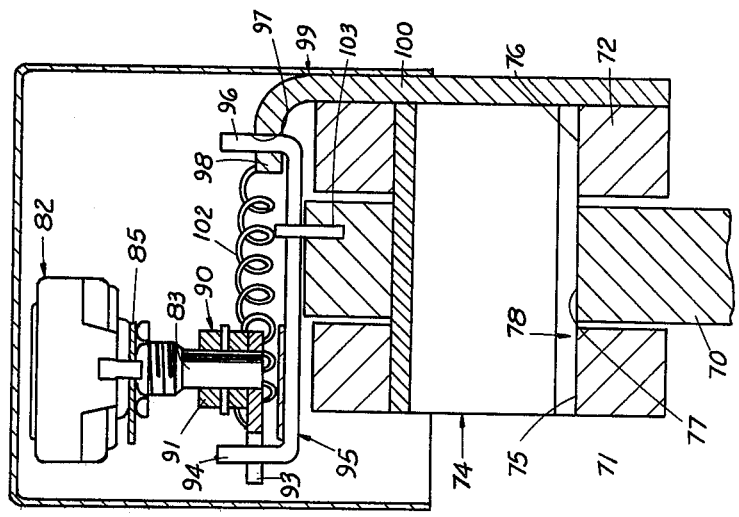
FIG 9
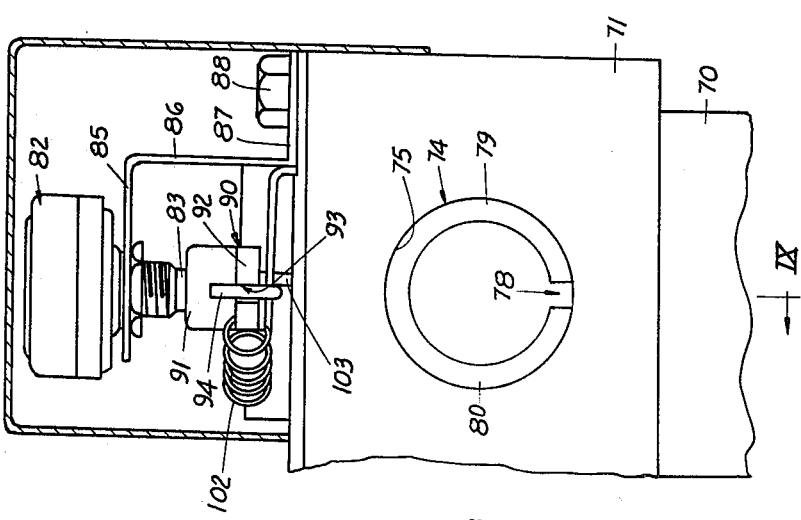
FIG 8
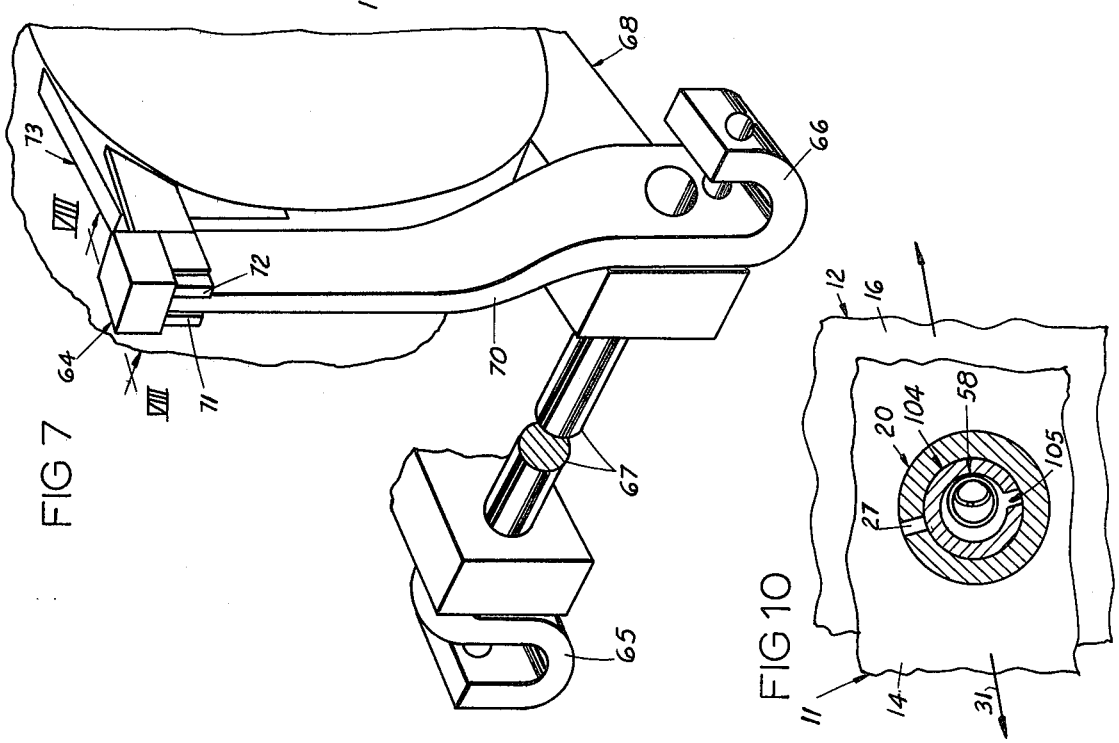
FIG 7
FIG 10

FORCE-MEASURING DEVICES

This invention relates to force-measuring devices and more particularly to devices which are highly accurate and reliable in operation while being comparatively simple in construction, readily installed and economically manufacturable.

BACKGROUND OF THE PRIOR ART

A variety of devices have heretofore been provided for measuring forces but such devices have generally been complicated and expensive and unsuitable for many applications, especially for measuring forces of relatively large magnitude, such as for example, the draft or pulling forces applied to plows or similar types of implements. Arrangements have been proposed using leaf springs or torsion bars deformed in proportion to applied forces, necessitating relatively complicated support arrangements and otherwise being quite expensive.

SUMMARY OF THE INVENTION

This invention was evolved with the general object of overcoming the disadvantages of prior art devices and of providing a device which is relatively simple and inexpensive in construction while being highly accurate, reliable and rugged.

Another object of the invention is to provide force measuring devices which can be readily applied in a variety of applications and easily installed, requiring little modification of structures to which applied.

In accordance with this invention, a force-transmitting element is provided which has the form of a conventional "roll pin", being of generally C-shaped cross-sectional configuration and having inner and outer generally cylindrical and concentric surfaces in an axially extending slot defined by facing angularly spaced surfaces. The element is readily installed in cylindrical openings of two members to transmit forces therebetween and when so installed, the members engage the outer cylindrical surface of the element at diametrically opposite portions thereof, such portions being located along a diametral plane transverse to a radial plane through the slot. The applied forces move such diametrically opposite portions toward each other and also move the slot surfaces toward each other in proportion to the magnitude of the forces transmitted and displacement measuring means are provided for measuring the displacement of one of the diametrically opposite portions toward the other.

This arrangement is quite simple and is readily used in a variety of applications. The element is quite inexpensive and the members can be readily formed to receive the element, simply by providing circular openings for receiving the element. It is also found that the deformation characteristics of such an element are very linear and a high degree of accuracy and consistency of measurement can be obtained.

Specific features of the invention relate to the construction of means for measuring the displacement of one of the diametrically opposed portions toward the other, the displacement means preferably including a potentiometer having a movable contact element with means being provided for moving the contact element in proportion to the relative displacement of the two diametrically opposed portions. Lever means are preferably provided, supported for pivotal movement about an axis in substantially fixed relation to one of the diametrically opposite portions with a first coupling between one of the diametrically opposed portions and the lever means at a point spaced a relatively short distance from the pivot axis and a second coupling between the lever means and the movable contact of the potentiometer, the second coupling being at a substantially greater distance to provide a mechanical advantage.

In one embodiment, a lever member is disposed within the force-transmitting element and includes a portion engaged from an internal surface of the element. In another embodiment, the lever member is located on the outside and is pivoted to one of the two members between which the force is transmitted while being coupled to the other of such members. In both embodiments, a mechanical advantage is obtained such as to obtain a relatively high ratio between rotation of a potentiometer shaft and the corresponding movement of diametrically opposed portions of the force-transmitting element toward each other.

The force-measuring devices of this invention have a variety of applications but are especially advantageous when used in measuring relatively large forces such as the drawing or pulling forces applied from tractors to plows or other farm implements. Accurate measurement of such draw forces is highly desirable, especially in applications in which the operation of the plow or other implement is automatically controlled to maintain the draw of force within predetermined limits and to prevent damage to the implement or the tractor in the event that obstructions or excessively high load conditions are encountered.

This invention contemplates other objects, features and advantages which will become more fully apparent from the following detailed description taken in conjunction with the accompanying drawings.

BRIEF DESCRIPTION OF THE DRAWINGS

FIG. 1 is a top plan view showing one preferred embodiment of a force-measuring device according to the invention;

FIG. 2 is a sectional view taken substantially along line II—II of FIG. 1;

FIG. 3 is a sectional view taken substantially along line III—III of FIG. 2;

FIG. 7 is a perspective view showing a modified embodiment according to the invention;

FIG. 8 is a side elevational view of the device of FIG. 7, looking from along line VIII—VIII of FIG. 7;

FIG. 9 is a sectional view taken substantially along line IX—IX of FIG. 8; and

FIG. 10 is a cross-sectional view similar to FIG. 3 but illustrating a modification of the device of FIGS. 1–6.

DESCRIPTION OF PREFERRED EMBODIMENTS

Figure 6:
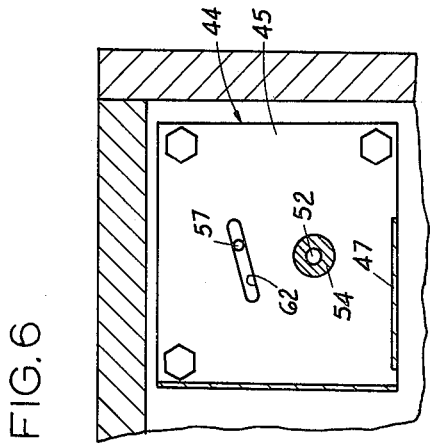
FIG. 6 is another sectional view taken substantially along line VI—VI of FIG. 2.
Figure 5:
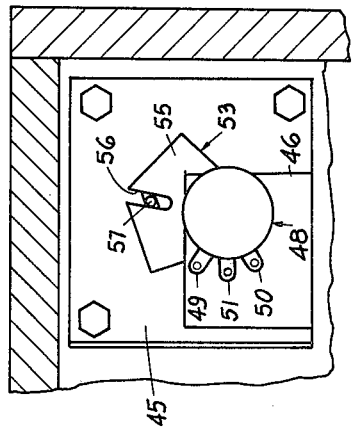
FIG. 5 is a sectional view taken substantially along line V—V of FIG. 2.
Figure 4:
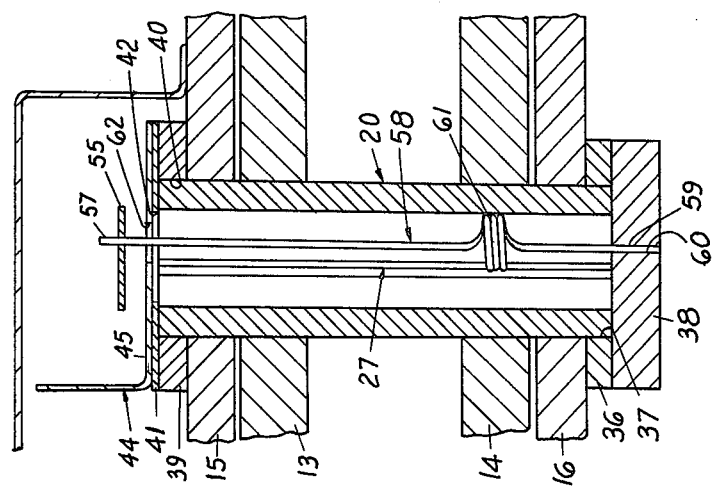
FIG. 4 is a sectional view taken substantially along line IV—IV of FIG. 1.

Reference numeral 10 generally designates a draft sensing device constructed in accordance with the principles of this invention. The illustrated device 10 is designed for measuring the transmission of the pulling or drawing force between a tractor draw bar or tongue generally designated by reference numeral 11 and a plow frame generally designated by reference numeral 12, it being understood that the device and the principles of the invention may be used in other applications.

In the illustrated arrangement, the draw bar or tongue 11 includes upper and lower portions 13 and 14, rigidly secured together by means not shown, and the plow frame 12 includes a pair of spaced upper and lower parallel portions 15 and 16 above and below the draw bar portions 13 and 14, and further includes portions 17 and 18 extending between the portions 15 and 16.

The device 10 includes an element 20 which extends along a vertical axis through aligned openings 21 and 22 in the portions 13 and 14 of the draw bar 11 and aligned openings 23 and 24 in the plow frame portions 15 and 16. Element 20 has the form of a conventional "roll pin," including inner and outer generally cylindrical and concentric surfaces 25 and 26 and a slot 27 which extends axially and radially, defined by facing surfaces 29 and 30 which are spaced a short angular distance apart. The element 20 thus has a generally C-shaped cross-sectional configuration. The center of the slot 27 is in a radial plane through the axis and transverse to the direction of drawing and reaction forces applied, indicated by arrows 31 and 32 in FIG. 3. When such forces are applied, the element 20 is resiliently deformed, moving the slot-defining surfaces 29 and 30 toward each other and also moving diametrically opposed wall portions 33 and 34 of the element 20 toward each other, portions 33 and 34 being generally in a diametral plane transverse to a radial plane through the center of the slot 27. The element 20 is of a resiliently deformable material, preferably steel, and with the stresses applied being below the proportional limits of the material, the movement of portions 33 and 34 toward each other is proportional to the draw force. In the device 10, such movement is sensed to develop an electrical signal proportional thereto, the electrical signal being thereby proportional to the draw force.

A plate 36 is secured to the underside of the lower frame portion 16 and has an opening 37 receiving the lower end of the element 20 with a second plate 38 being secured to the underside of the plate 36 under the lower end of the element 20. Another plate 39 is secured on top of the upper frame member 15 and has an opening 40 receiving the upper end of the device 20 with an additional plate 41 being secured on top of plate 39 and having an opening 42 the diameter of which is less than the outer diameter of the element 20.

A bracket 44 of sheet metal is provided having a base portion 45 secured on top of the plate 41 and having a portion 46 spaced above the base portion 45, there being a connecting wall portion 47 between edges of portions 45 and 46. A potentiometer 48 is mounted on the portion 46 of the bracket 44 and is of conventional form, including an arcuately extending resistance element (not shown) the ends of which are connected to terminals 49 and 50 and also including a movable contact element or slider, also not shown, connected electrically to a third terminal 51 and carried from a shaft 52. An arm 53 is provided having a hub portion 54 secured to the shaft 52 and including a plate portion 55 formed with a slot 56 which extends radially with respect to the axis of rotation of the potentiometer shaft 52.

Slot 56 receives an end portion 57 of a lever member 58 which has an opposite end portion 59 affixed in an opening 60 in the plate 38. The lever member 58 is formed of relatively stiff but resilient wire and has an intermediate coiled formation 61 the axis of which is coincident with that of the upper and lower end portions 57 and 59 which are of a common vertical axis generally parallel to and offset a short distance from the axis of the element 20.

The coiled formation 61 engages the inside surface 25 of the element 20 and when draw forces are applied from the draw bar 11 against the outer surface of the element 20 to move the portion 34 toward the portion 33, the formation 61 is moved toward the portion 33 of element 20 with the portion of member 58 between the formation 61 and the lower end portion 59 being resiliently deformed. The member 58 effectively pivots about an axis close to the fixedly supported lower end portion 59. With such movement, the upper end portion 57 of member 58 is moved a distance which is much greater than the movement of formation 61 and, being engaged in slot 56 of the arm 53, it rotates the arm 53 and the potentiometer shaft 52 to a corresponding angular extent.

The base portion 45 of the bracket 44 is preferably provided with a slot 62 through which the end portion 57 extends, the slot 62 being located in the diametral plane of the portions 33 and 34 and being thereby transferred to a radial plane through the center of the slot 27. Slot 62 serves to insure that the movement of the end of portion 57 is consistently in the proper direction and unaffected by any camming action between portion 57 and the slot 56 or otherwise.

Referring to FIGS. 7, 8 and 9, reference numeral 64 generally designates a modified form of device constructed in accordance with the principles of this invention, designed for use in an arrangement in which a plow or other implement to be drawn is connected to a pair of hook-like lugs 65 and 66 secured to opposite end portions of a transverse shaft 67 supported from a frame structure 68 at the rear of a tractor for pivotal movement relative thereto. An arm 70 is rigidly secured to lug 66 and shaft 67 and extends upwardly with the upper end of the arm 70 being positioned between a pair of spaced parallel portions 71 and 72 of a bracket 73 which is secured to the frame structure. A force-transmitting element 74 is provided having opposite end portions disposed in aligned cylindrical openings 75 and 76 in the portions 71 and 72 of the bracket 73 and a central portion of the element 74 extends through a cylindrical opening 77 in the upper end portion of the arm 70.

The element 74 has a configuration similar to that of the element 20 in the device 10, including an axially extending slot 78. When pulling forces are applied to an implement connected to the lugs 65 and 66, the arm 70 is pivoted, urging a portion 79 of the element 74 toward a diametrically opposed portion 80, resiliently deforming the element 74 and reducing the width of the slot 78. Portions 79 and 80 are located along a diametral plane transverse to a radial plane through the center of slot 78. The result is that the upper end of the arm 70 moves relative to the bracket portions 71 and 72 in proportion to the movement of portion 79 toward the portion 80 and means are provided for measuring such displacement of the upper end of arm 70 relative to bracket portions 71 and 72.

A potentiometer 82 having a shaft 83 is mounted on the upper face of the portion 71 of bracket 73 by means of a bracket including a portion 85 on which the potentiometer 82 is mounted, a portion 86 extending downwardly from one end of the portion 85 and a portion 87 extending outwardly from the lower edge of the portion 86, portion 87 being secured to the portion 71 of the bracket 73 by a suitable screw 88.

An arm 90 is provided including a hub portion 91 secured to the shaft 83 and a plate portion 92 which is formed with a slot 93 extending radially with respect to the axis of the potentiometer shaft 83. The slot 93 receives an up-turned portion 94 at one end of a lever member 95 which has an up-turned portion 96 at its opposite end, extending upwardly through an opening 97 in a leg 98 of a bracket 99 having a downwardly extending leg 100 which is secured against the outer face of the portion 72 of bracket 73. A coiled tension spring 102 is connected between the portion 92 of arm 90 and the leg portion 98 of the bracket 99, to urge the arm 90 in one direction and to obviate any "play" in the mechanical action. A pin 103 is affixed in an opening in the upper end of the arm 70 and is engagable with a portion of the lever member 75 which is quite close to its pivot axis, i.e. the axis of the upturned portion 96. The lever member 95 is thereby rotated in response to movement of the upper end of the arm 70 relative to the bracket 73 and the arm 90 on the potentiometer shaft 83 is rotated through a corresponding angle.

It is noted that in both of the illustrated embodiments, a mechanical advantage is obtained through the use of the lever members to obtain a substantial ratio between the angular movement of the potentiometer shaft and the corresponding relative displacement of the diametrically opposed portions of the force-transmitting element. The result is that a high degree of accuracy is obtained while at the same time, conventional types of relatively inexpensive potentiometers are used. The force-transmitting elements 20 and 74 are preferably conventional roll pins which are readily available at low cost. It is found that such roll pins are highly linear in performance and produce consistent and highly reliable results.

Roll pins are readily available in a wide variety of sizes but in cases in which it is necessary to measure very large forces, it may be desirable to use a modified arrangment as shown in FIG. 10 in which a second element 104 is disposed inside the element 20, the element 104 having a form similar to that of the element 20 and including an axially and radially extending slot 105 which is preferably located in a position diametrically opposite the slot 27, although it could be located in alignment with the slot 27. With this arrangement, the elements 104 and 20 act together, both being deformed in response to transmitted forces, with greater strength being obtained.

It will be understood that modifications and variations may be effected without departing from the spirit and scope of the novel concepts of this invention.

We claim as our invention:

1. A device for measuring the force transmitted between two members comprising:

a force-transmitting element of resiliently deformable material and of generally C-shaped cross-sectional configuration having inner and outer generally cylindrical and concentric surfaces and an axially extending slot defined by facing angularly spaced surfaces, said members being engageable with said outer cylindrical surface at diametrically opposite portions of said element lying along a diametrical plane generally transverse to a radial plane through said slot to move said diametrically opposite portions toward each other and to move said slot surfaces toward each other in proportion to the force transmitted between said members by said element;

displacement measuring means including a movable contact element for measuring the displacement of one of said diametrically opposite portions of said element toward the other;

lever means;

means supporting said lever means for pivotal movement about an axis in substantially fixed relation to said other of said diametrically opposite portions and in a plane generally transverse to said diametrical plane through said diametrically opposite portions;

first coupling means coupling said one of said diametrically opposite portions to said lever means at a point spaced a first predetermined distance from said axis; and second coupling means coupling said movable contact element to said lever means at a point spaced a second predetermined distance from said axis, said second predetermined distance being substantially greater than said first predetermined distance.

2. In a device as defined in claim 1, said second coupling means comprising means defining a slot in one of said lever and arm means receiving a portion of the other of said lever and arm means.

3. In a device as defined in claim 1, said axis of pivotal movement being located generally at one end of said element, and said lever means extending from said axis within said element to the opposite end of said element.

4. In a device as defined in claim 3, said first coupling means comprising means on said lever means coupled to a portion of said inner surface of said element.

5. In a device as defined in claim 3, means adjacent said opposite end of said element for defining a guide slot receiving and guiding said lever means.

6. In a device as defined in claim 1, said lever means being located outside said element and extending generally parallel to the axis of said element.

7. In a device as defined in claim 1, one of said members including portions having cylindrical openings receiving opposite end portions of said element and the other of said members including a portion having a cylindrical opening receiving an intermediate portion of said element.

8. In a device as defined in claim 7, said means supporting said lever means attached to one of said portions of said one of said members and said first coupling means coupling said other of said members to said lever means, a potentiometer means mounted on the other of said pair of portions of said one of said members and including a shaft, arm means on said shaft, and second coupling means between said lever means and said arm means.

9. In a device as defined in claim 1, a second force-transmitting element disposed within the first force-transmitting element and of generally C-shaped cross-sectional configuration like that of the first element including an axially extending slot, the slot of the second element being disposed in diametrically opposed relation to the slot of the first element.

10. A device for measuring the force transmitted between two members comprising:

a force transmitting element of resiliently deformable material and of generally C-shaped cross sectional configuration having inner and outer generally cylindrical and concentric surfaces and an axially extending slot defined by facing angularly spaced surfaces, said members being engageable with said outer cylindrical surface at diametrically opposite portions of said element lying along a diametrical plane generally transverse to a radial plane through said slot to move said diametrically opposite portions toward each other and to move said slot surfaces toward each other in proportion to the force transmitted between said members by said element;

displacement measuring means being a potentiometer including a movable contact element and including means for moving said movable contact element in proportion to the displacement of said one of said diametrically opposite portions toward the other for measuring the displacement of one of said diametrically opposite portions of said element toward the other;

lever means;

means supporting said lever means for pivotal movement about an axis in substantially fixed relation to said other of said diametrically opposite portions and in a plane generally transverse to said diametrical plane through said diametrically opposite portions;

first coupling means coupling said one of said diametrically opposite portions to said lever means at a point spaced a first predetermined distance from said axis; and second coupling means coupling said movable contact element to said lever means at a point spaced a second predetermined distance from said axis, said second predetermined distance being substantially greater than said first predetermined distance.

11. In a device as defined in claim 10, said potentiometer means having a shaft, arm means on said shaft, said second coupling means being operative between said second point of said lever means and a point on said arm means spaced from the axis of said potentiometer shaft.

12. In a device as defined in claim 10 said second coupling means comprising means defining a slot in one of said lever and arm means receiving a portion of the other of said lever and arm means.

13. In a device as defined in claim 10, said axis of pivotal movement being located generally at one end of said element, and said lever means extending from said axis within said element to the opposite end of said element.

14. In a device as defined in claim 13, said first coupling means comprising means on said lever means coupled to a portion of said inner surface of said element.

15. In a device as defined in claim 13, means adjacent said opposite end of said element for defining a guide slot for receiving and guiding said lever means.

16. In a device as defined in claim 10, said lever means being located outside said element and extending generally parallel to the axis of said element.

17. In a device as defined in claim 10, one of said members including portions having cylindrical openings receiving opposite end portions of said element and the other of said members including a portion having a cylindrical opening receiving an intermediate portion of said element.

18. In a device as defined in claim 17 said means supporting said lever means attached to one of said portions of said one of said members and said first coupling means coupling said other of said members to said lever means; and said displacement measuring potentiometer mounted on the other of said pair of portions of said one of said members and including a shaft, arm means on said shaft, and second coupling means between said lever means and said arm means.

19. In a device as defined in claim 10, a second force transmitting element disposed within the first force-transmitting element and of generally C-shaped cross sectional configuration like that of the first element including an axially extending slot, the slot of the second element being disposed in diametrically opposed relation to the slot of the first element.

* * * * *